United States Patent
Larson et al.

(10) Patent No.: US 12,405,667 B2
(45) Date of Patent: Sep. 2, 2025

(54) ELECTRONIC DEVICE HAVING A SHOCK-RESISTANT HAPTIC ENGINE

(71) Applicant: Apple Inc., Cupertino, CA (US)

(72) Inventors: Nils E. Larson, San Jose, CA (US); David Hiemstra, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 298 days.

(21) Appl. No.: 17/993,637

(22) Filed: Nov. 23, 2022

(65) Prior Publication Data

US 2023/0168740 A1   Jun. 1, 2023

Related U.S. Application Data

(60) Provisional application No. 63/284,505, filed on Nov. 30, 2021.

(51) Int. Cl.
| | |
|---|---|
| *G06F 1/16* | (2006.01) |
| *G06F 3/01* | (2006.01) |
| *G08B 6/00* | (2006.01) |
| *H05K 5/00* | (2025.01) |
| *H05K 7/00* | (2006.01) |

(52) U.S. Cl.
CPC ............... *G06F 3/016* (2013.01); *G08B 6/00* (2013.01)

(58) Field of Classification Search
CPC .............. G06F 3/016; G06F 3/01; G08B 6/00
See application file for complete search history.

(56) References Cited

U.S. PATENT DOCUMENTS

| | | | |
|---|---|---|---|
| 6,243,078 B1 | 6/2001 | Rosenberg | |
| 8,283,839 B2 | 10/2012 | Heim | |
| 8,411,427 B2 | 4/2013 | Jeong et al. | |
| 9,607,491 B1* | 3/2017 | Mortimer | G06F 3/016 |
| 9,821,672 B2 | 11/2017 | Chae et al. | |
| 9,978,226 B1* | 5/2018 | Mankame | G08B 6/00 |
| 10,146,309 B2 | 12/2018 | Tissot et al. | |
| 10,222,863 B1* | 3/2019 | Sen | G06F 3/016 |
| 10,726,258 B2 | 7/2020 | Park et al. | |
| 10,828,674 B2* | 11/2020 | Sreetharan | B06B 1/045 |
| 10,942,571 B2* | 3/2021 | Hendren | G06F 1/1616 |
| 10,952,427 B2 | 3/2021 | Kwon et al. | |
| 10,976,822 B2* | 4/2021 | Dogiamis | G06F 3/016 |
| 11,002,589 B1 | 5/2021 | Zhang et al. | |
| 11,177,680 B2 | 11/2021 | Lee et al. | |
| 11,246,229 B2 | 2/2022 | Lee et al. | |
| 2008/0156406 A1* | 7/2008 | Breed | B60C 23/0433 |
| | | | 152/415 |
| 2010/0090814 A1* | 4/2010 | Cybart | G06F 3/016 |
| | | | 340/407.2 |

(Continued)

FOREIGN PATENT DOCUMENTS

JP   2008141857   6/2008

*Primary Examiner* — Anthony M Haughton
(74) *Attorney, Agent, or Firm* — Brownstein Hyatt Farber Schreck, LLP

(57) ABSTRACT

Systems, methods, and apparatuses described herein correspond to non-linear spring assemblies of a haptic engine. An enclosure and/or lid of a haptics engine may include a number of non-linear spring assemblies to dampen or reduce peak forces between internal components of the haptics engine and the enclosure and/or the lid. By dampening or reducing peak forces, damage to internal components of the haptic engine and/or an associated electronic device may be reduced or eliminated.

20 Claims, 6 Drawing Sheets

(56) References Cited

U.S. PATENT DOCUMENTS

| | | |
|---|---|---|
| 2017/0127166 A1 | 5/2017 | Noma |
| 2020/0103972 A1* | 4/2020 | Amin-Shahidi ...... G06F 3/0346 |
| 2020/0289001 A1 | 9/2020 | Mantrawadi et al. |
| 2020/0393397 A1 | 12/2020 | Vulto et al. |
| 2022/0101992 A1 | 3/2022 | Porter et al. |
| 2024/0079940 A1 | 3/2024 | Hiemstra et al. |
| 2024/0079941 A1 | 3/2024 | Hiemstra et al. |

* cited by examiner

ELECTRONIC DEVICE HAVING A SHOCK-RESISTANT HAPTIC ENGINE

CROSS-REFERENCE TO RELATED APPLICATION(S)

This application is a nonprovisional patent application of and claims the benefit of U.S. Provisional Patent Application No. 63/284,505, filed Nov. 30, 2021 and titled "Electronic Device Having a Shock-Resistant Haptic Engine," the disclosure of which is hereby incorporated herein by reference in its entirety.

FIELD

Disclosed embodiments generally relate to components of an electronic device. More particularly, the disclosed embodiments relate to a haptic engine configured to provide a haptic output to an electronic device and to dampening structures of the haptic engine.

BACKGROUND

Modern electronic devices commonly include a number of output devices to provide feedback or information to a user. One type of output device is a haptic engine which is used to provide a haptic output, such as an impulse or a vibration, to a user. Haptic outputs may be provided in response to operations of, or interactions with, an electronic device, such as when a user account receives an electronic message or interacts with an application.

Some haptic engines include a suspended mass that is driven to produce a haptic output. In some cases, an electronic device within which a haptic engine is located may be dropped or forcefully struck against a hard object (e.g., an impact event). These impact events may cause the suspended mass to strike an enclosure of the haptic engine, due to the impact events surpassing limitations of springs suspending the suspended mass. Such movement of the suspended mass may result in various internal components of the haptic engine and/or an associated electronic device becoming damaged. Example damage includes deformed or broken internal components of at least one of the haptic engine or the electronic device and may result in a loss of function of the haptic engine or the electronic device.

SUMMARY

This summary is provided to introduce a selection of concepts in simplified form that are further described herein. This summary is not intended to identify key features or essential features of the claimed subject matter, nor is it intended to be used as an aid in determining the scope of the claimed subject matter.

In various embodiments of the provided disclosure, a haptic engine may be used to provide a haptic output. To avoid damage from impact events, such as dropping an electronic device containing the haptic engine, an enclosure of the haptic engine may include a non-linear spring assembly. The non-linear spring assembly may include one or more cantilevered leaf springs which, during impact events, may come into contact with internal components of the haptic engine. The one or more cantilevered leaf springs may deflect or otherwise reduce peak forces imparted to the internal components of the haptic engine arising from the impact events, thereby preventing damage to the internal components. Additional features will become apparent herein.

BRIEF DESCRIPTION OF THE DRAWINGS

Reference will now be made to representative embodiments illustrated in the accompanying figures. It should be understood that the following descriptions are not intended to limit the embodiments to one or more preferred embodiments. To the contrary, they are intended to cover alternatives, modifications, and equivalents as may be included within the spirit and scope of the described embodiments as defined by the appended claims. Similar reference numerals have been used, where practicable, to designate similar features.

Figure 1:
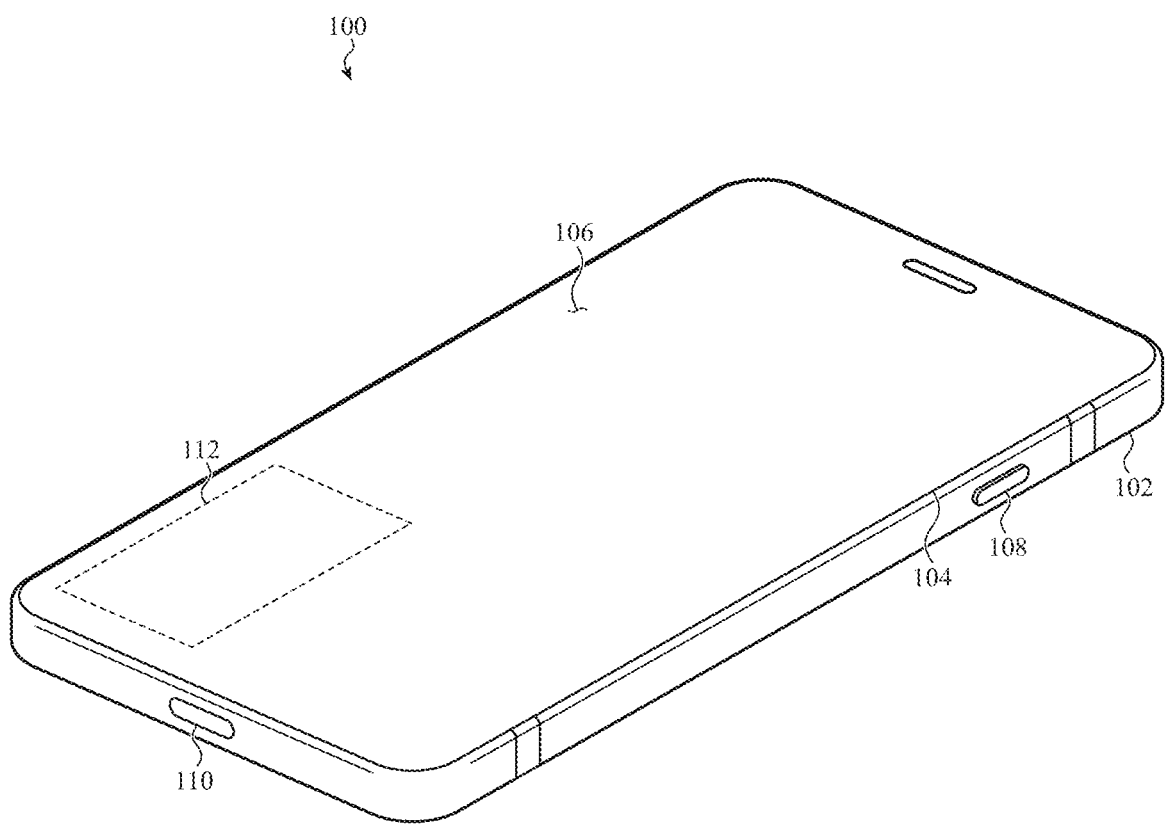
FIG. 1 illustrates an example electronic device, such as a smart phone, and an associated haptic engine provided within the electronic device, as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The embodiments described herein are directed to an electronic device having a haptic engine which provides a haptic output. The haptic output may be provided in response to user interactions and/or inputs with the electronic device.

Haptic engines (e.g., haptic actuators) are typically provided within electronic devices to provide haptic feedback to a user of the electronic device. A haptic engine, for example, can produce a vibration or a series of vibrations in response to functions of an electronic device, such as receiving a text message or phone call. By providing haptic feedback to the user, the user may be alerted to certain events and may experience a more intuitive user experience.

Conventional haptic engines, however, are susceptible to damage from impact events, such as when an electronic device containing a haptic engine collides with a hard object (e.g., when dropped). Such haptic engines, for example, may contain a mass suspended within a haptics enclosure.

During normal operations, the mass suspended within the haptics enclosure is driven at a controlled acceleration to create a haptic output. However, during impact events, the mass may collide with the haptics enclosure, thereby damaging components of the haptic engine or an associated electronic device. Such damage may include plastically deforming or breaking components and/or welds of the haptic engine and/or electronic device. The deformation and/or breakage can lead to a number of issues including excess noise during a haptic event, miscalibration, increased power consumption, and total inoperability of the haptic engine.

In various embodiments such as described herein, an enclosure of a haptic engine is associated with a non-linear spring assembly to reduce impact forces and stresses on the haptic engine and/or an electronic device during impact events. The non-linear spring assembly may include one or more cantilevered leaf springs that absorb and reduce the intensity of the impact forces and stresses. In addition, a surface of a haptics inner assembly may be curved (e.g., a curved top surface) in a contact zone to direct impact forces and stresses toward specific locations of the one or more cantilevered leaf springs.

The cantilevered leaf springs may additionally be chamfered along a portion of a length of the cantilevered leaf springs to further introduce variability in the spring rate of the cantilevered leaf springs (e.g., in a non-linear manner).

As discussed herein, the one or more cantilevered leaf springs may have a variable spring rate and a stiffness of the one or more cantilevered leaf springs may increase as an inner assembly of the haptic engine presses against a haptics enclosure during an impact event. The variable spring rate may establish reaction forces below the damage limits of sensitive components of the haptic engine. Further, the variable spring rate may result in a smooth load transfer to reduce a peak force by increasing an associated load time. For example, the one or more cantilevered leaf springs may absorb and distribute impact energy before damage limits of the sensitive components are reached.

The foregoing embodiments depicted in FIGS. 1-4 and the various alternatives thereof and variations thereto are presented, generally, for purposes of explanation and to facilitate an understanding of various configurations and constructions of a system, such as described herein. However, it will be apparent to one skilled in the art that some of the specific details presented herein may not be required in order to practice a particular described embodiment, or an equivalent thereof.

FIG. 1 depicts an electronic device 100 incorporating a haptic engine 112. In the illustrated embodiment, the electronic device 100 is implemented as a mobile device (e.g., a smart phone). A different type of electronic device can be used in other embodiments, including the electronic device 200 discussed with respect to FIG. 2. In additional or alternative examples, the electronic device can be a gaming device, a digital music player, a sports accessory device, a medical device, a health assistant, a tablet computing device, a notebook computer, a smart phone, an electronic watch, any combination thereof, and any other type of electronic devices that provide, or are suitable to provide, haptic feedback to a user.

The electronic device 100 includes a housing 102 at least partially surrounding a display 104. The housing 102 can enclose, or partially enclose, the display and other internal components of the electronic device 100. The housing 102 can be formed of one or more components operably connected together, such as a front piece and a back piece. Alternatively, the housing 102 can be formed of a single piece operably connected to the display 104.

A display 104 may be provided within an opening of the housing 102. The display 104 can provide a visual output to the user and can be implemented with any suitable technology, including, but not limited to, a liquid crystal display (LCD) element, a light emitting diode (LED) element, an organic light-emitting display element (OLED), an organic electroluminescence element, and so on.

A cover 106 may be positioned over the front surface (or a portion of the front surface) of the electronic device 100. The cover 106 may be positioned over the display 104. In some embodiments, at least a portion of the cover 106 can sense touch and/or force inputs. The cover 106 can be formed with any suitable material, such as glass, plastic, sapphire, combinations thereof, and so on. In some embodiments, touch and force inputs can be received by the portion of the cover 106 that covers the display 104. In some embodiments, touch and/or force inputs can be received across other portions of the cover 106 and/or portions of the housing 102.

Various layers of a display stack (such as the cover 106, the display 104, a touch sensor layer, a force sensor layer, and so on) may be adhered together with an adhesive and/or may be supported by a common frame or portion of the housing 102. A common frame may extend around a perimeter, or a portion of the perimeter, of the layers, may be segmented around the perimeter or a portion of the perimeter, or may be coupled to the various layers of the display stack in another manner.

In some embodiments, each of the layers of the display stack may be attached or deposited onto separate substrates that may be laminated or bonded to each other. The display stack may also include other layers for improving the structural or optical performance of the display 104, including, for example, polarizer sheets, color masks, and so on. Additionally, the display stack may include a touch and/or force sensor layer for receiving inputs on the cover 106 of the electronic device 100.

As will be described in more detail later, the electronic device 100 includes at least one haptic engine 112. The haptic engine 112 may have any size or shape and is not limited to the size and shape illustrated in FIG. 1. The haptic engine 112 may be positioned in an internal cavity of the electronic device 100 at any number of locations (e.g., not limited to the location illustrated in FIG. 1).

The haptic engine 112 is configured to provide haptic feedback to a user when an input action is detected. In some embodiments, the haptic engine 112 is additionally configured to detect input actions and/or events arising from an application and/or an interaction with a display 104 and/or a cover 106 (e.g., a touch sensitive display).

The haptic engine 112 can function as both an input sensor and an output device, though, in some embodiments, the haptic engine 112 operates just as an output device. In some embodiments, at least some of the components of the haptic engine 112 can be used as the input sensor. For example, when the haptic engine 112 is an electromagnetic actuator (e.g., a linear actuator), an input action can cause a magnet assembly and a coil assembly of the electromagnetic actuator to move with respect to each other.

This movement induces a current (or "input device signal") in the coil assembly. The input device signal may indicate that an input action associated with the input device has occurred. A processing device may be responsive to the input device signal and may, in turn, cause a haptic output signal to be transmitted to the coil assembly. The haptic output signal causes the electromagnetic actuator to produce a haptic output. The haptic output may be perceived by the user as haptic feedback that indicates the input action has been registered or entered by the electronic device 100 and/or other input devices.

The electronic device 100 may additionally include an input device 108 (e.g., a button) and a communication port 110. The input device 108 may be any type of input device and may, in some cases, be depressible and/or rotatable to control an operation of the electronic device 100. The communication port 110 may include conductive portions to electrically couple the electronic device 100 with external components, such as an electrical outlet or audio headphones.

Figure 2:
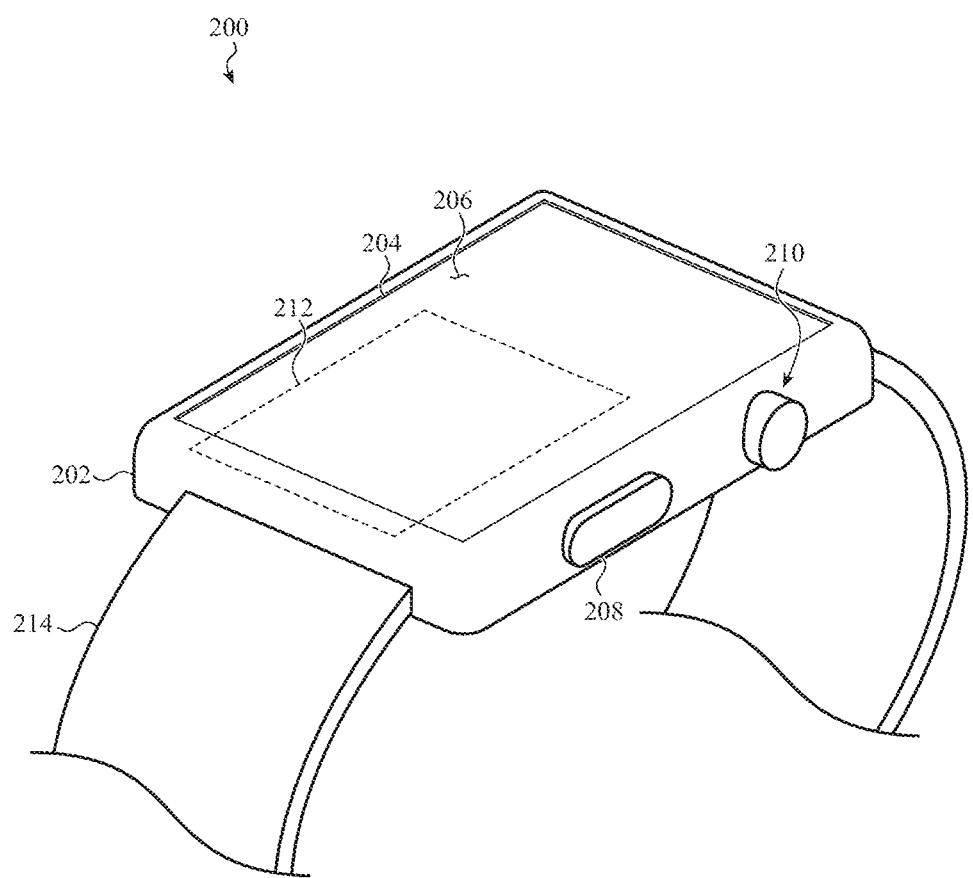
FIG. 2 illustrates an example electronic device, such as an electronic watch, and an associated haptic engine provided within the electronic device, as described herein.

FIG. 2 illustrates an example of an electronic device 200 that can include a haptic engine 212 configured to produce haptic output based on an input action. In the illustrated embodiment, the electronic device 200 is implemented as an electronic or smart watch that is worn by a user (e.g., on a user's wrist).

The electronic device 200 includes input devices 208 and 210. In some embodiments, one or both of the input devices 208 and 210 may be configured as input/output devices. The term "input device" is intended to be construed broadly to include both input and input/output devices.

An input device may include an input component, such as a button, knob, dial, crown, and so on. Although shown on a side of the electronic device 200, the input devices 208 and 210 can be positioned substantially anywhere on the electronic device 200. The input device 208 may be a button and may be depressible. The input device 210 may be a rotatable knob and may be rotated and/or depressed.

As will be described in more detail later, the electronic device 200 includes at least one haptic engine 212 operably connected to one or both input devices. The haptic engine 212 may have any size or shape and is not limited to the size and shape illustrated in FIG. 2. The haptic engine 212 may be located within an internal cavity of the electronic device 200 (e.g., as defined by housing 202) and is not limited to any particular location within the internal cavity.

The haptic engine 212 is configured to detect an input action, which may be associated with one or both input devices 208 and 210, and to provide haptic feedback to a user when an input action is detected. In some embodiments, the haptic engine 212 is configured to detect input actions and/or events arising from an application and/or an interaction with a display (e.g., a touch sensitive display).

The haptic engine 212 can function as both an input sensor and an output device, though, in some embodiments, the haptic engine 212 operates just as an output device. In some embodiments, at least some of the components of the haptic engine can be used as the input sensor. For example, when the haptic engine is an electromagnetic actuator (e.g., a linear actuator), an input action (e.g., a translation of input device 208 and 210) can cause a magnet assembly and a coil assembly of the electromagnetic actuator to move with respect to each other.

This movement induces a current (or "input device signal") in the coil assembly. The input device signal may indicate that an input action associated with the input device has occurred. A processing device may be responsive to the input device signal and may, in turn, cause a haptic output signal to be transmitted to the coil assembly. The haptic output signal causes the electromagnetic actuator to produce a haptic output. The haptic output may be perceived by the user as haptic feedback that indicates the input action has been registered or entered by the electronic device 200 and/or the input device(s) 208 or 210.

In the illustrated embodiment, the input device 210 is a crown and the input device 208 an input button. Input devices in other embodiments are not limited to these configurations. For example, an input device may be a rocker switch, a portion of the housing 202, one or more keys in a keyboard, a slide switch, a virtual icon or image on a display, or any other suitable input device.

The input device 210 (e.g., crown) is configured to receive translational and rotational input actions. For example, the input device 210 may include a shaft that extends into the electronic device 200. Pressing the input device 210 can cause the shaft, or components coupled to the shaft, to move or translate a given distance. Additionally or alternatively, the shaft may rotate when a user rotates the input device 210. The amount of shaft rotation can be detected and measured by an optical encoder positioned adjacent to the shaft. The amount of shaft rotation may be used as an input to the electronic device 200 and/or to an application program running on the electronic device 200.

One or more functions can be performed when the input device 210 is rotated and/or pressed. For example, if the display 204 of the electronic device 200 is displaying a time keeping application, the input device 210 may be rotated in either direction to change or adjust the position of the hands or the digits that are displayed for the time keeping application.

Additionally or alternatively, the input device 210 may be rotated to move a cursor or other type of selection mechanism from a first displayed location to a second displayed location in order to select an icon or move the selection mechanism between various icons that are presented on the display 204. Additionally or alternatively, the input device 210 may be pressed to perform various functions, such as changing the image on a display, waking the electronic device 200 from a sleep state, and/or to select or activate an application.

In some embodiments, the input device 210 can be rotated or pressed to disable an application or function. For example, the input device 210 may be pressed to disable an alert produced by an application on the electronic device 200 or received by the electronic device 200.

In some embodiments, the input device 208 (e.g., an input component or input button) can be configured to be pressed to cause various functions to be performed and/or disabled. The input device 208 may include a shaft that extends into the electronic device 200. Pressing the input device 208 can cause the shaft, or components coupled to the shaft, to move or translate a given distance. For example, a single press can activate an application and/or display a particular image or screen on the display.

Additionally or alternatively, a single press may disable or delay an alert. A multiple press (e.g., a double press or double click) can activate an application and a component within the electronic device 200. For example, a double click may access an application that uses a wireless communication network to transmit data associated with the application (e.g., an electronic payment application). Additionally or alternatively, a press-hold may operate to turn on and turn off the electronic device 200 or to place the electronic device 200 in a power saving mode (e.g., a mode where minimal functions and applications operate and other applications and functions are disabled).

In some embodiments, pressing both of the input devices 208 and 210 in various combinations can cause one or more functions to be performed. For example, pressing the input device 210 and then immediately pressing the input device 208 can cause an action to be performed on the electronic device 200. Additionally or alternatively, simultaneous press-holds on the input devices 208 and 210 can cause another action to be performed on the electronic device 200.

The electronic device 200 further includes a housing 202 that forms an outer surface or partial outer surface for the internal components of the electronic device 200. The housing 202 defines openings and/or apertures that receive and/or support a display 204 and the input devices 208 and 210. The housing 202 can be formed of one or more components operably connected together, such as a front piece and a back piece.

Alternatively, the housing 202 can be formed of a single piece operably connected to the display 204. In the illustrated embodiment, the housing 202 is formed into a substantially rectangular shape, although this configuration is not required. For example, certain embodiments may include a substantially circular enclosure.

The display 204 can provide a visual output for the electronic device 200 and/or function to receive user inputs to the electronic device 200. For example, the display 204 may incorporate an input device configured to receive touch input, force input, temperature input, and the like. The display 204 may be substantially any size and may be positioned substantially anywhere on the electronic device 200.

The display 204 can be implemented with any suitable display technology, including, but not limited to, a multi-touch sensing touchscreen device that uses a liquid crystal display (LCD) element, a light emitting diode (LED) element, an organic light-emitting display (OLED) element, or an organic electro luminescence (OEL) element.

A cover 206 may be positioned over the display 204 and may be formed from any number of transparent materials, including sapphire, glass, transparent plastic, and so on. In some embodiments, the cover 206 protects the display 204 from external damage.

One or more bands 214 may additionally be provided to secure a user's body part (e.g., a user's wrist) to the electronic device 200. The one or more bands 214 may be formed from any number of suitable materials, including rubber, fabric, interlocking metal, and so on.

Figure 3A:
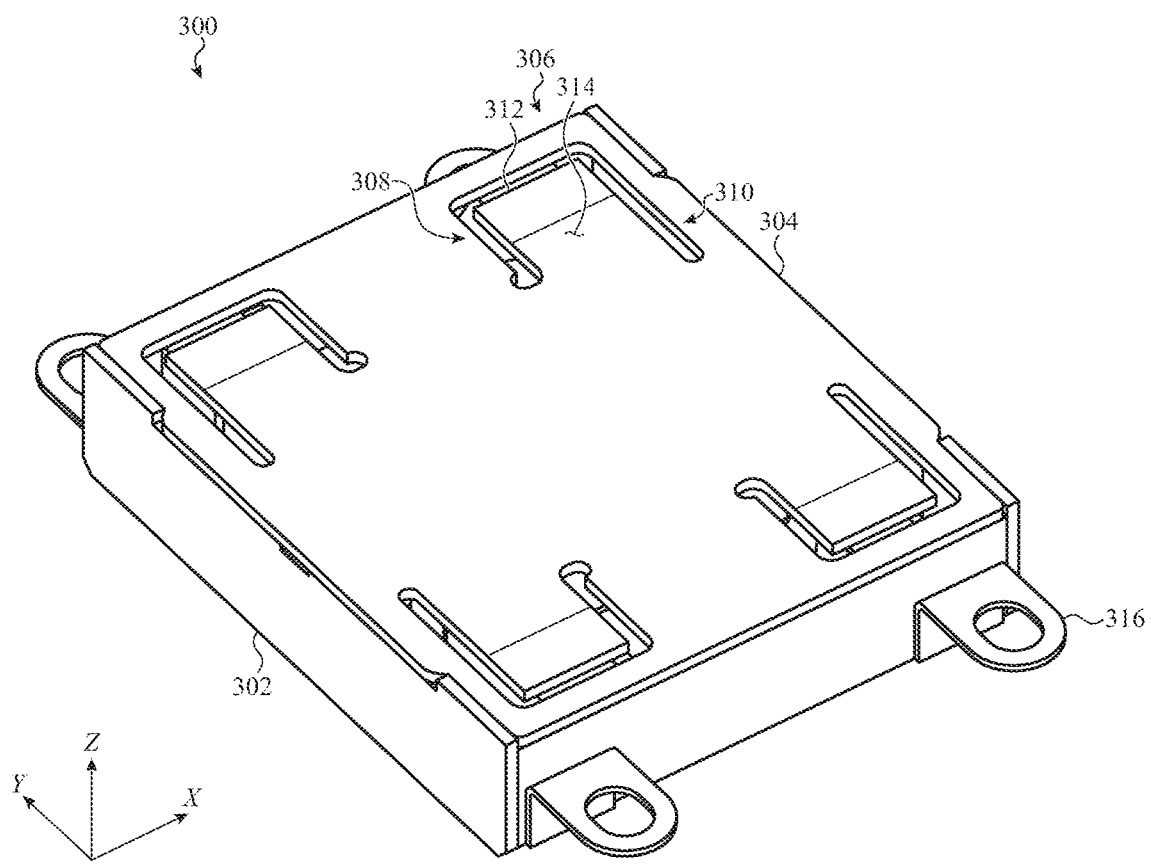
FIGS. 3A-3C illustrate various views of a haptic engine including a non-linear spring assembly having one or more cantilevered leaf springs to reduce peak forces during impact events, as described herein.
Figure 3B:
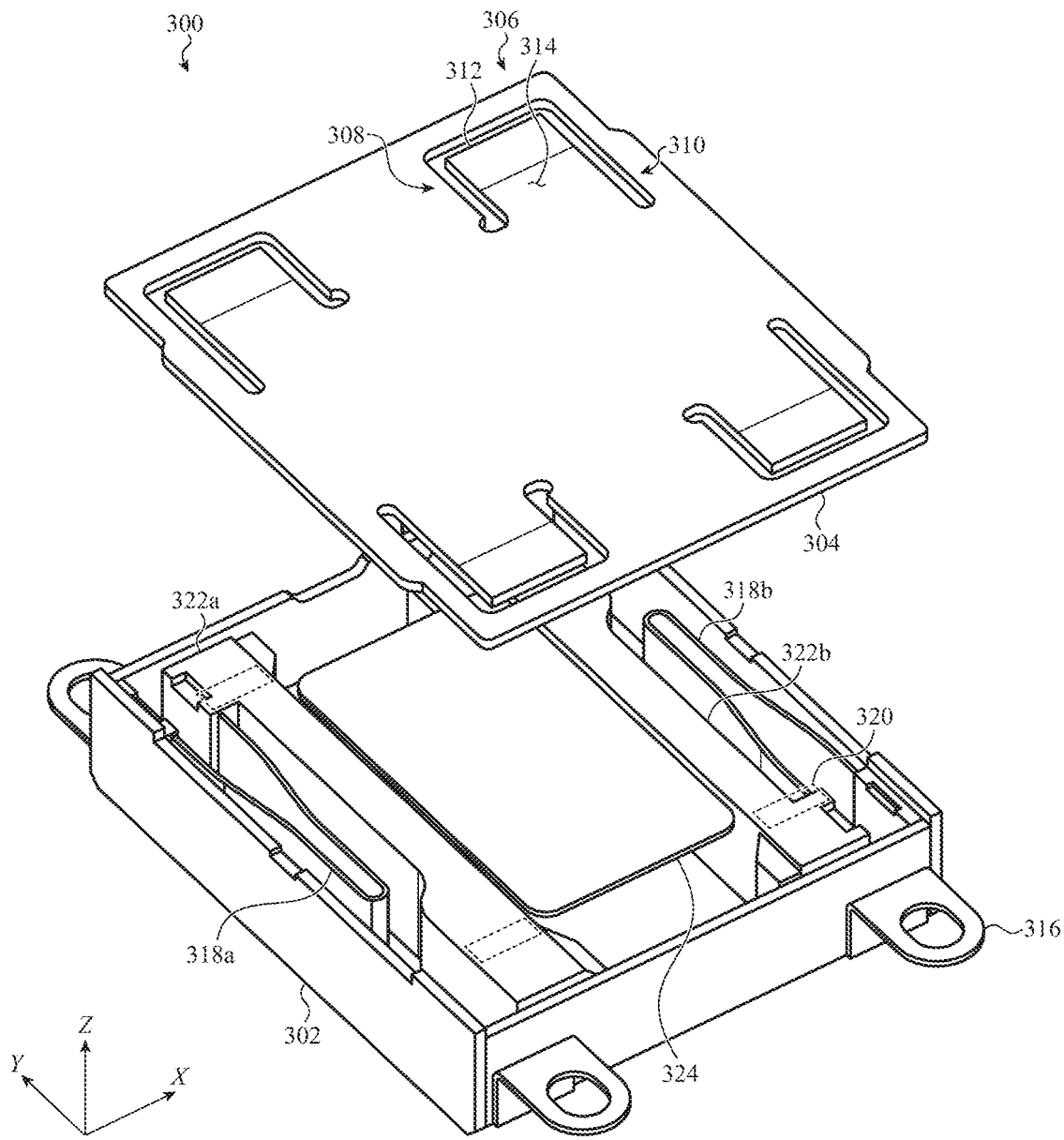
Figure 3C:
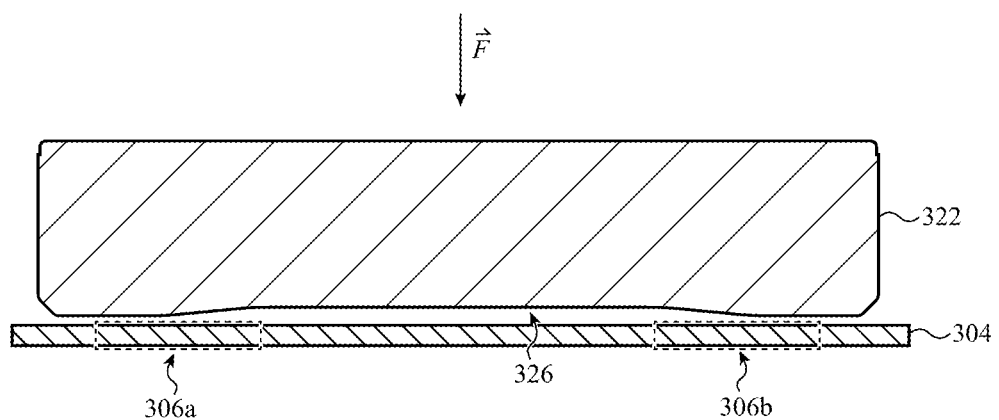

Example embodiments of a haptic engine will now be discussed. FIGS. 3A-3C depict an isometric view of an example haptic engine 300. The haptic engine illustrated in FIGS. 3A-3C may be positioned within an internal cavity of an electronic device, such as the electronic devices illustrated in FIGS. 1-2 (e.g., a smart phone or an electronic watch). The dimensions depicted in FIGS. 3A-3C are not necessarily to scale and any shape or size of a haptic engine may b used in accordance with the principles discussed herein.

FIG. 3A illustrates a haptic engine 300 as it may appear when assembled. As noted above, the size and shape of the illustrated haptic engine 300 are provided merely as examples and any number of sizes, shapes, or arrangements may be used as understood by a person of ordinary skill in the art.

The haptic engine 300 includes an enclosure 302 which defines a housing of the haptic engine 300. The enclosure may include a removeable lid 304, which lid 304 may be positioned over internal components contained within the enclosure 302 (see, e.g., FIG. 3B). The enclosure 302 and the lid 304 may be formed from any number of materials, including ceramics, glass, resin, plastic, metal (e.g., sheet metal), any combination thereof, and so on. The enclosure 302 and the lid 304 may be formed from different materials or may be formed from the same material.

A number of attachment fixtures 316 may be coupled to a side of the enclosure 302. The attachment fixtures 316 may be used to secure the haptic engine 300 when installed within an electronic device. In the embodiment illustrated in FIG. 3A, the attachment fixtures 316 include a through-hole. A fastener, such as a nail or screw, may pass through the through-hole of the attachment fixtures 316 to secure the haptic engine 300 to a corresponding portion of the electronic device (e.g., via a threaded hole).

The lid 304 may further include a non-linear spring assembly 306. In the embodiment illustrated in FIG. 3A, the lid 304 includes four non-linear spring assemblies 306, though any number and/or arrangement of non-linear spring assemblies may be used. For clarity, only one non-linear spring assembly 306 is labeled, though it is noted that each of the non-linear spring assemblies may define similar characteristics and the numbering is omitted with respect to similar elements solely for clarity and ease of description.

The non-linear spring assembly 306 can be formed as a cut-out from the lid 304 to form a cantilevered spring, which may be referred to as a cantilevered leaf spring 314. In other cases, the spring assemblies 306 can be formed by molding, stamping, or other suitable manufacturing operations. In some cases, the spring assemblies 306 can be attached to the lid, which may include welding, brazing, gluing, interferences fit, threaded or pressed fasteners, or any other suitable attachment techniques. In some cases, the spring assemblies 306 can include helical springs, compressible materials (e.g., compressible polymer), or other suitable energy dissipating mechanisms.

The cantilevered leaf spring 314 may be surrounded by non-equivalent channels 308 and 310. A first channel 308 may have a length shorter than a second channel 310 (or vice versa) such as illustrated in FIGS. 3A-3B. This arrangement may reduce a force curve associated with an impact event, may control a stiffness of the cantilevered leaf spring 314, and/or at least partially control a non-linearity of the non-linear spring assembly 306. In some embodiments, the channels 308 and 310 may have equivalent lengths. An end of either or both of the channels 308 and 310 may be rounded and/or may have a diameter larger than a diameter of the channels 308 and 310.

The cantilevered leaf spring 314 may additionally include a chamfered portion 312 positioned at an end of the cantilevered leaf spring 314. The chamfered portion 312 may result in the cantilevered leaf spring 314 gradually increasing in thickness over its length. For example, at an end of the cantilevered leaf spring 314 (e.g., at an end of the chamfered portion 312), a thickness of the cantilevered leaf spring 314 may be at a minimum and the thickness may increase until reaching a maximum after the chamfered portion 312 ends (e.g., as visualized in FIG. 3A by a horizontal line).

Due, in part, to the chamfered portion 312, the cantilevered leaf spring 314 may have a non-linear stiffness resulting in a non-linear resistive force during an impact event. For example, the cantilevered leaf spring 314 may have low stiffness at the beginning of an impact force and may have high stiffness at full deflection (e.g., at the end of the impact force). Operations of the cantilevered leaf spring 314 during the impact event are discussed with reference to FIG. 3C, below.

In some embodiments, the non-linear spring assembly 306 may be tunable during or after manufacture by controlling a thickness of the cantilevered leaf spring 314 and/or establishing a degree of the chamfered portion 312.

In some embodiments, multiple faces of the haptic engine 300 (e.g., a top face and a bottom face) may be defined by a respective lid (or side) and each lid (or side) may include one or more non-linear spring assemblies 306. For example, a top face and a bottom face may include respective non-linear spring assemblies 306 (e.g., in a z-direction). Additionally or alternatively, one or more non-linear spring assemblies may be formed in a component positioned adjacent the enclosure 302, and may similarly absorb forces that the haptic engine 300 experiences.

FIG. 3B illustrates an exploded view of a haptic engine 300, such as the haptic engine as discussed with respect to FIG. 3A. In FIG. 3B, a lid 304 is separated from a remaining portion of the enclosure 302. For simplicity, duplicative description is omitted with respect to FIG. 3B and similar elements may be similar to those discussed with respect to FIG. 3A.

The enclosure 302 may define an internal cavity within which a moveable mass 324 is positioned. In some embodiments, the moveable mass 324 may be any haptics module used to provide a haptic effect in response to electrical and/or digital impulses.

The moveable mass 324 may be suspended within the internal cavity of the enclosure 302 by one or more flexures 318a and 318b. The flexures 318a and 318b may be flat springs, as illustrated in FIG. 3B, or may be any other type of spring usable to fully or partially suspend the moveable mass 324 within the enclosure 302. In some cases, actuation of the haptic engine causes the moveable mass 324 to move along an axis (or other movement path) defined by the one of more flexures 318. For example, actuation of the haptic engine may cause the moveable mass 324 to move toward and away from the sidewalls of the enclosure 302. Actuation of the haptic engine and/or movement along the axis (or other movement path) defined by the one or more flexures 318 may not cause the moveable mass 324 to contact the spring assemblies 306.

Contact portions 322a and 322b may be positioned between the flexures 318a, 318b and the moveable mass 324. As discussed with respect to FIG. 3C, the contact portions 322a and 322b may have a curved top surface to direct impact forces to respective non-linear spring assemblies (e.g., non-linear spring assembly 306). In some embodiments, the impact forces may be directed to a respective contact zone (e.g., contact zone 320) positioned below a portion of a respective non-linear spring assembly 306 (e.g., below the chamfered portion 312 of the cantilevered leaf spring 314). The contact portions 322a and 322b may encapsulate the moveable mass 324 (e.g., in a XY-plane) or may surround a portion of the moveable mass 324.

FIG. 3C illustrates a cross-section of a portion of a haptic engine 300, such as illustrated in FIGS. 3A-3B. The cross-section may be taken along the Y-axis, though, in some embodiments, a corresponding cross-section taken along the X-axis may appear as it does in FIG. 3C.

As illustrated in FIG. 3C, a contact portion 322 may be positioned next to a lid 304, such as when the lid 304 is provided on the enclosure 302 as illustrated in FIG. 3A. The contact portion 322 may be any one of the first contact portion 322a or the second contact portion 322b.

The contact portion 322 may include a curved surface 326 extending between a location of a first non-linear spring assembly 306a and a second non-linear spring assembly 306b. Through this arrangement, forces applied to any one of the contact portion 322 or the lid 304 may be directed toward the non-linear spring assemblies 306a and 306b.

An operation of the haptic engine 300 will now be discussed, with reference to an applied force F. The applied force F may be created in response to an impact event such as when an electronic device containing the haptic engine 300 is dropped or struck against a hard object. In conventional haptic engines, such a force may result in damage to internal components of the haptic engine as such components may strike an enclosure with a high force.

In the haptic engine 300 discussed and depicted with respect to FIGS. 3A-3C, the non-linear spring assemblies 306a and 306b are used to smooth the applied force F to lower a peak force (e.g., by distributing the applied force F over a period of time).

In particular, an applied force F may move the contact portion 322 toward the lid 304. As the contact portion 322 has a curved surface 326, the majority of the applied force F is directed toward respective non-linear spring assemblies 306a and 306b. Though two non-linear spring assemblies 306a and 306b are illustrated in FIG. 3C, any number of non-linear spring assemblies may be provided (e.g., four non-linear spring assemblies as illustrated in FIGS. 3A-3B).

As depicted and discussed with respect to FIGS. 3A-3B, each of the non-linear spring assemblies includes a cantilevered leaf spring which further includes a chamfered portion. The chamfered portion has a thickness less than a thickness of a surrounding unchamfered portion of the cantilevered leaf spring. Therefore, the chamfered portion has a decreased thickness with respect to the unchamfered portion.

The contact portion 322 may first contact the chamfered portions of the cantilevered leaf springs during an impact event. As the contact portion 322 moves across the cantilevered leaf springs, a stiffness of the cantilevered leaf springs may increase due to an increasing thickness of the cantilevered leaf springs. The increasing stiffness imparts an increasing restive force to the contact portion 322 (e.g., a non-linear force is applied).

In the event of strong applied forces, the contact portion 322 may further contact a portion of the lid 304 or enclosure 302. However, the contact between the contact portion 322 and the lid 304 or enclosure 302 may have a reduced intensity as a significant part of the force has been received at the cantilevered leaf springs. Significant damage to the haptic engine 300 may, therefore, be reduced or eliminated.

In some situations, an air gap between the contact portion and/or moveable mass 324 may be maintained when the cantilevered leaf springs receive the substantial entirety of the applied force.

Through the above process and variable spring rate of the cantilevered leaf springs, the load caused by the applied force F can be smoothly transferred to avoid high peak forces (e.g., impulses). While the energy caused as a result of the applied force F may be the same as in conventional systems, the energy may be spread over a longer period of time due to the presence and operation of the cantilevered leaf springs.

Figure 4:
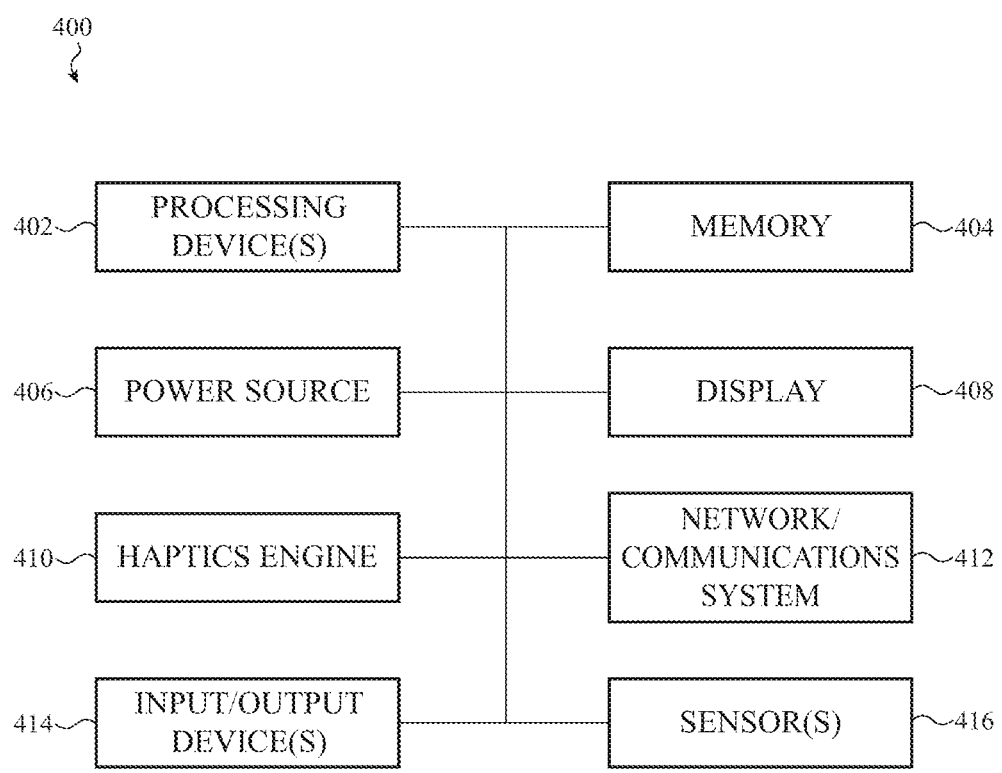
FIG. 4 depicts a block diagram representation of an electronic device, as described herein.

FIG. 4 depicts a block diagram of components of an example electronic device 400 such as described herein. The schematic representation depicted in FIG. 4 may correspond to components of the devices depicted in FIGS. 1-3C as described above. FIG. 4 may also more generally represent other types of electronic devices incorporating a haptic engine.

The electronic device 400 includes processing device(s) 402 operably connected with a computer-readable memory 404. The processing device(s) 402 may be operatively connected to the memory 404 component via an electronic bus or bridge. The processing device(s) 402 may be implemented as one or more computer processors or microcontrollers configured to perform operations in response to computer-readable instructions. The processing device(s) 402 may include a central processing unit (CPU) of the electronic device 400. Additionally, and/or alternatively, the processing device(s) 402 may include other electronic circuitry within the electronic device 400 including application specific integrated chips (ASIC) and other microcontroller devices. The processing device(s) 402 may be configured to perform functionality described in the examples above.

The memory 404 may include a variety of types of non-transitory computer-readable storage media, including, for example, read access memory (RAM), read-only memory (ROM), erasable programmable memory (e.g., EPROM and EEPROM), or flash memory. The memory 404 is configured to store computer-readable instructions, sensor values, and other persistent software elements.

The electronic device 400 includes a power source 406 that is configured to provide electrical power to the components of the electronic device 400. The power source 406 may be a battery. The power source 406 may include one or more power storage cells that are linked together to provide an internal supply of electrical power. The power source 406 may be operatively coupled to power management circuitry that is configured to provide appropriate voltage and power levels for individual components or groups of components within the electronic device 400. The power source 406, via power management circuitry, may be configured to receive power from an external source, such as an alternating current power outlet. The power source 406 may store received power so that the electronic device 400 may operate without connection to an external power source for an extended period of time, which may range from several hours to several days.

In some embodiments, the electronic device 400 includes one or more input/output devices 414. The input/output devices 414 are devices that are configured to receive input from a user or the environment and/or output signals to the user. The input devices may include, for example, a push button, a touch-activated button, a haptics engine 410, a capacitive touch sensor, a touch screen (e.g., a touch-sensitive display or a force-sensitive display), a capacitive touch button, dial, crown, and so on. The output device may include one or more speakers to provide audio output, a display 408, a haptics engine 410, and so on. The input/output devices 414 may be a combined input/output device or may individually perform input/output functions.

The electronic device 400 may also include one or more sensors 416, such as a touch sensor, a force sensor, or other sensors such as a capacitive sensor, an accelerometer, a barometer, a gyroscope, a proximity sensor, a light sensor, and so on. In some cases, the electronic device 400 includes a sensor array (also referred to as a sensing array) which includes multiple sensors. For example, a sensor array associated with a protruding feature of a cover member may include an ambient light sensor, a LIDAR sensor, and a microphone. The sensors may be operably coupled to processing circuitry.

In some embodiments, the sensors 416 may detect deformation and/or changes in configuration of the electronic device and be operably coupled to processing circuitry that controls the display based on the sensor signals. In some implementations, output from the sensors is used to reconfigure the display output to correspond to an orientation or folded/unfolded configuration or state of the device.

Example sensors 416 for this purpose include accelerometers, gyroscopes, magnetometers, and other similar types of position/orientation sensing devices. In addition, the sensors may include a microphone, acoustic sensor, light sensor (including ambient light, infrared (IR) light, ultraviolet (UV) light, optical facial recognition sensor, a depth measuring sensor (e.g., a time of flight sensor), a health monitoring sensor (e.g., an electrocardiogram (erg) sensor, a heart rate sensor, a photoplethysmogram (ppg) sensor, a pulse oximeter, a biometric sensor (e.g., a fingerprint sensor), or other types of sensing device.

The display 408 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, and so on. If the display 408 is a liquid-crystal display or an electrophoretic ink display, the display 408 may also include a backlight component that can be controlled to provide variable levels of display brightness. If the display 408 is an organic light-emitting diode or an organic electroluminescent-type display, the brightness of the display 408 may be controlled by modifying the electrical signals that are provided to display elements. In addition, information regarding configuration and/or orientation of the electronic device 400 may be used to control the output of the display 408 as described with respect to sensors 416. In some cases, the display 408 is integrated with a touch and/or force sensor in order to detect touches and/or forces applied along an exterior surface of the electronic device 400.

The electronic device 400 may also include a network/communications system 412 that is configured to transmit and/or receive signals or electrical communication from an external or separate device. The network/communications system 412 may be configured to couple to an external device via a cable, adaptor, or other type of electrical connector.

The electronic device 400 may also include a haptics engine 410 such as described above. The haptics engine 410 may be an input/output device or just an output device. The haptics engine 410 may provide a vibration in response to operations of the electronic device 400. For example, the haptics engine 410 may provide a vibration in response to a phone call or text message.

Features of the various embodiments discussed herein may reduce the risk of damaging a haptics engine and components adjacent to or surrounding the haptics engine as provided within an electronic device. The presence of the non-linear spring assemblies also does not significantly contribute to a size of the haptics engine, providing the benefit of impulse dampening without requiring more internal space within an electronic device.

As used herein, the phrase "one or more of" or "at least one of" preceding a series of items, with the term "and" or "or" to separate any of the items, modifies the list as a whole, rather than each member of the list. The phrase "one or more of" or "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "one or more of A, B, and C" or "one or more of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
   a housing;
   a display positioned at least partially within the housing; and
   a haptic engine positioned at least partially within the housing, the haptic engine comprising:
      an enclosure defining an internal cavity;
      a moveable mass positioned within the internal cavity and defining a contact portion and configured to move along an axis to provide haptic output; and
      a lid coupled to the enclosure and enclosing the moveable mass within the internal cavity, the lid defining a spring portion, wherein the contact portion is configured to contact the spring portion and dampen movement of the haptic engine in response to a force on the haptic engine perpendicular to the axis and exceeding a threshold.

2. The electronic device of claim 1, wherein:
   the lid comprises one or more cut-outs defining the spring portion; and
   the one or more cut-outs define a cantilevered spring.

3. The electronic device of claim 2, wherein the contact portion contacts the cantilevered spring closer to a base of the cantilevered spring than a free end of the cantilevered spring as the force on the haptic engine increases.

4. The electronic device of claim 2, wherein a thickness of the cantilevered spring varies along a length of the cantilevered spring.

5. The electronic device of claim 1, wherein the contact portion has a curved surface.

6. The electronic device of claim 1, wherein:
   the haptic engine comprises one or more flexures that couple the moveable mass to the enclosure; and
   the one or more flexures suspend the moveable mass within the internal cavity.

7. The electronic device of claim 1, wherein:
   the lid defines multiple spring portions;
   the moveable mass defines multiple contact portions; and
   each contact portion contacts a different spring portion when the force on the haptic engine exceeds the threshold.

8. The electronic device of claim 1, wherein an area of the contact portion that contacts the spring portion increases as the force on the haptic engine increases.

9. A haptic engine comprising:
   an enclosure defining an internal cavity;
   a moveable mass suspended within the internal cavity; and
   a lid coupled to the enclosure, the lid comprising a set of cantilevered springs; wherein in response to a force perpendicular to an axis of motion applied to the haptic engine exceeding a threshold, the moveable mass contacts at least one cantilevered spring of the set of cantilevered springs and the at least one cantilevered spring dampens the movement of the movable mass.

10. The haptic engine of claim 9, wherein:
    each cantilevered spring of the set of cantilevered springs comprises a base portion and an end portion; and
    the end portion of each cantilevered spring comprises a chamfer.

11. The haptic engine of claim 10, wherein each chamfer is positioned on an outside surface of the lid.

12. The haptic engine of claim 9, wherein:
    the moveable mass defines a set of contact portions; and
    each contact portion of the set of contact portions contacts a cantilevered spring of the set of cantilevered springs in response to the force on the haptic engine exceeding the threshold.

13. The haptic engine of claim 9, wherein each cantilevered spring comprises a non-linear spring.

14. The haptic engine of claim 9, wherein the set of cantilevered springs is defined by a set of cutouts in the lid.

15. The haptic engine of claim 9 wherein:
    the haptic engine comprises one or more flexures that couple the moveable mass to the enclosure;
    in response to actuation of the haptic engine, the moveable mass is configured to move along the axis, the axis being defined by the one or more flexures; and
    movement along the axis in response to the actuation does not cause the moveable mass to contact the set of cantilevered springs.

16. An electronic device comprising:
    a housing; and
    a haptic engine positioned at least partially within the housing and comprising:
       an enclosure comprising:
          a bottom portion defining a first set of springs;
          a top portion defining a second set of springs; and
          a sidewall extending between the top portion and the bottom portion;
       a mass positioned within an interior of the enclosure; and
       one or more flexures suspending the mass within the interior of the enclosure;
    wherein:
       in response to an actuation signal, the haptic engine causes the mass to move along an axis defined by the one or more flexures; and
       in response to an impact force other than parallel to the axis and above a threshold, the mass contacts the first set of springs, the second set of springs, or both the first set of springs and the second set of springs.

17. The electronic device of claim 16, wherein the one or more flexures couple the mass to the sidewall.

18. The electronic device of claim 16, wherein:
    the mass defines a first set of contacts that is configured to contact the first set of springs in response to the impact force; and
    the mass defines a second set of contacts that is configured to contact the second set of springs in response to the impact force.

19. The electronic device of claim 16, wherein:
    the first set of springs is defined by one or more openings in the bottom portion of the enclosure; and the second set of springs is defined by one or more openings in the top portion of the enclosure.

20. The electronic device of claim 19, wherein springs of the first set of springs and the second set of springs each comprise a cantilevered spring.

\* \* \* \* \*